May 14, 1957    J. FEDERSPIEL    2,792,235
SERVO-MECHANISM FOR REGULATING THE SUSPENSION OF VEHICLES
Filed Oct. 13, 1953    7 Sheets-Sheet 1

INVENTOR
JEAN FEDERSPIEL
By Linton and Linton
ATTORNEYS

May 14, 1957  J. FEDERSPIEL  2,792,235
SERVO-MECHANISM FOR REGULATING THE SUSPENSION OF VEHICLES
Filed Oct. 13, 1953  7 Sheets-Sheet 6

INVENTOR
JEAN FEDERSPIEL
BY Linton and Linton
ATTORNEYS

May 14, 1957    J. FEDERSPIEL    2,792,235
SERVO-MECHANISM FOR REGULATING THE SUSPENSION OF VEHICLES
Filed Oct. 13, 1953    7 Sheets-Sheet 7

INVENTOR
JEAN FEDERSPIEL
By Linton and Linton
ATTORNEYS

United States Patent Office 2,792,235
Patented May 14, 1957

2,792,235

SERVO-MECHANISM FOR REGULATING THE SUSPENSION OF VEHICLES

Jean Federspiel, Paris, France

Application October 13, 1953, Serial No. 385,879

Claims priority, application France November 4, 1952

12 Claims. (Cl. 280—124)

The present invention is concerned with an improvement in the suspension of vehicles and is more particularly directed to means for regulating the suspension thereof.

The study of the motion of vehicle (such as road vehicles, cross country vehicles or rails vehicles) has shown that passengers cannot tolerate oscillations without discomfort if their amplitude $Am$ exceeds a certain limit which is a function of their frequency $n$.

Figure 1:
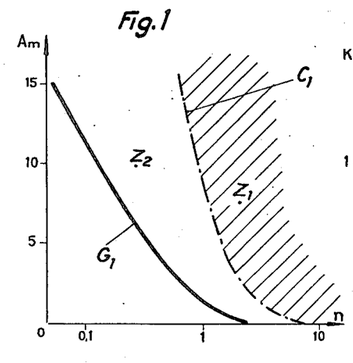
Fig. 1, as aforementioned, is a diagram of a tolerance curve.

The tolerance curve which thus defines a relationship between $Am$ (in centimetres) and $n$ (in cycles per second) is shown in Figure 1 of the accompanying drawings. On the right of this curve is the zone of discomfort $Z_1$ and on the left the zone of comfort $Z_2$.

Figure 2:
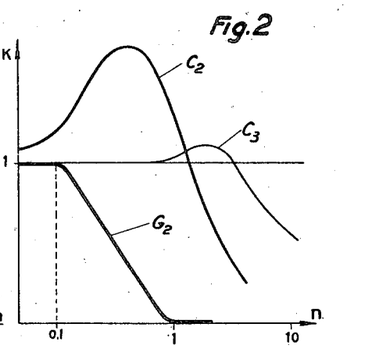
Fig. 2 is a further diagram showing the variations of the transmission coefficient according to the frequency of the oscillations.

Now experience has shown that for the lower frequencies (less than 4 cycles per second) the amplitude of the oscillations in ordinary vehicles (for example motor cars) frequently exceeds the limiting amplitudes defined by the tolerance curve (particularly when there are "bumps"). This is explained by the fact that the transmission coefficient $K$ of the suspension (defined by the relationship between the amplitude transmitted by the said suspension and the amplitude received, originating from the wheel) is always in the frequency band which is greater than 1, as shown in the curves $C_2$ and $C_3$ in Figure 2 of the accompanying drawings, corresponding to two suspensions of different type. Actually the suspensions hitherto constructed are effective for frequencies greater than 10 cycles per second, which they absorb in practice, but they become inoperative or even act as amplifiers for lower frequencies. It is the object of the present invention to overcome this disadvantage by establishing a relationship between $Am$ and $n$ as shown by the curve $G_1$, which is situated entirely inside $Z_2$. The corresponding variations in the coefficient of transmission $K$ are represented by the curve $G_2$, Figure 2. It will be seen that in these circumstances the coefficient $K$ will never be greater than 1 and that the absorption will occur even for very low frequencies: 0.1 cycle per second in the example chosen. This invention can be applied to all ground vehicles: motor cars, lorries, motor coaches, cross-country vehicles or combat vehicles, as well as rail vehicles.

The means used by the present invention to create a suspension having the above characteristics consists in inserting, at any point in the chain of suspension members extending between at least one of the axles and the chassis of the vehicles, a lifting member of variable length, forming part of a servo-mechanism which also comprises two devices governing the variations in length of the above member. One of these devices is quick-acting and the other slow-acting, and both are dependent on the position of pre-determined points of the suspension in relation to reference positions.

More precisely, the quick-acting control device modifies the length of the lifting member indicated above in the same manner as the displacements of the usual resilient members of the suspension (springs or torsion bars).

This intervention of the quick-acting device takes place as soon as a pre-determined point of the said usual resilient members is displaced in relation to a reference position connected, for example, to the chassis of the vehicle.

On the other hand, the slow-acting control device preferably intervenes to restore to a desired magnitude the distance between the wheel axle and the chassis of the vehicle, this action being permanent but with an adequate time lag.

Other features of the present invention will be apparent from the following description reference being made to the accompanying drawings in which:

Figures 10, 11 and 12 show respectively in longitudinal vertical section, side view and rear view, a detailed embodiment of the invention, Figure 10a being a detailed view.

In one preferred embodiment of the invention (Figure 3) the variable-length lifting member A, inserted between the chassis B and one of the wheels D of the vehicle, is attached by one end to the terminal portion $a$ of the chain of normal resilient suspension devices E, while its other end is connected at $b$ to the axle of the wheel D.

Figure 3:
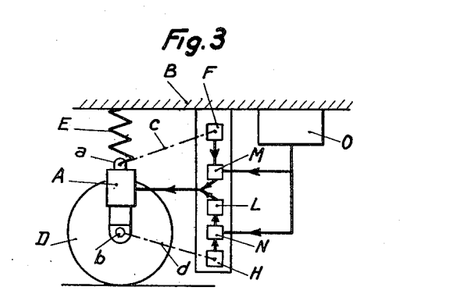
Figure 3 is an explanatory diagram of one specific embodiment of the invention.

The other members of the servo-mechanism comprise a quick-acting control device shown diagrammatically at F, and a slow-acting control device consisting of the control device proper H and the retarding system L. F and H act respectively on a group of distributors M and N which, from a suitable source of power O, supply motive power to the member A in order to vary its length in the required manner.

The setting in operation of the devices F and H depends on the position of the points $a$ and $b$ respectively, in relation to reference positions defined in relation to the chassis B. In other words: the devices F and H act on the distributors M and N, independently of one another and in the appropriate manner, to restore the points $a$ and $b$ to their reference positions.

The first of these positions is preferably selected as a function of the tension or the torsion of the members E. If the latter consist of a spring, the variations in the extension of the spring may determine the triggering of F. The reference position relating to H may in turn be defined by the distance between the chassis B and the wheel axle. In Figure 3, the connection between the points $a$ and $b$ and the control device F and H is shown diagrammatically by the dot-and-dash lines $c$ and $d$.

Under a constant load, at a constant speed and when travelling along a straight line, the variations in position of the points $a$ and $b$ originate from inequalities in the ground encountered by the wheel D. The purpose of the device F is to compensate immediately for these inequalities in such a manner as to maintain the height of the chassis B constant in relation to a fixed reference system.

The system H acts differently: its purpose is to maintain the height of the chassis B constant not in a fixed reference system but in relation to the ground. But the retarding device L prevents this action from taking place when there are rapid variations in the height of the ground in relation to a fixed reference system. It can therefore be said that with the device according to the invention, during a short space of time the height of the chassis remains invariable, and that over a long period, the height of the chassis follows the average height of the ground with a time lag, all these heights being relative to a fixed reference system.

In these circumstances, the quick-acting control device, and the distributors on which it acts, will be referred to hereafter, for the sake of conciseness, as the "corrective" system, the slow-acting control device being the "compensating" system.

One example of a device as described in Figure 3 is described in more detail with reference to Figure 4. The latter shows the chassis B supported by a wheel D through a lever $f$ articulated at $g$. The other end of this lever is attached at $b$ to the draw-spring E, by means of the member A of variable length consisting here of a fluid-controlled jack.

The control fluid is preferably oil but could also be water, air, etc. The fluid is stored in a low pressure reservoir Q, communicating with a filter R and a pump S. The latter supplies the fluid to a high pressure reservoir O through a self-closing valve T ensuring the charging of the reservoir O or returning the fluid to Q through the pipe $h$ when O is charged. The reservoir O is connected to two distributors U and V for example of the valve type. Beside U and V there are two other distributors W and Y likewise of the valve type. The outlet chamber of U and the inlet chamber of W are in communication via the pipe $j$ and the pipe $k$ with the compression chamber of the jack A. At the same time, the outlet chamber of V and the inlet chamber of Y also communicate with the compression chamber of A via the pipes $k$, $l$ and the retarding system L. Two levers $p$ and $q$ articulated on the chassis B have one of their ends fixed at $a$ and $b$ respectively, while the other ends govern the valves of U, W and V, Y.

The lever $p$ and the distributors U and W constitute respectively the quick-acting control device F and the distributor M in Figure 3, $q$ and V, Y being H and N. The possible path of the fluid in the various pipelines is shown by the arrows. It will be seen that according to the manner in which the length of the spring E varies, $p$ acts on the valve of U or on that of W. In these circumstances, if the spring E is extended, the fluid under pressure has left A for Q via W, and A itself is extended. Conversely, if E is contracted, A too would be reduced in length, fluid under pressure having been introduced from O through U. The variations in length of the jack A, governed by F, therefore tend to be substituted for those of the spring without any appreciable inertia (the time lag being of the order of 0.1 second). In contrast to the spring, however, the jack A has no elasticity.

Similarly, the lever $q$ acts on the valves of V or Y to bring about the reduction or extension in length of A as the case may be, these variations in length taking place with a relatively long time lag (10 seconds for example).

Thus in the event of control by the quick-acting device F, the jack A varies in the same sense as the spring E. On the other hand, in the event of control by H it acts in the opposite sense.

The device forming the subject of the invention can be applied to all suspenison systems and further examples are shown in Figures 5 to 9, Figure 4 having already dealt with the case of a draw-spring suspension.

In the case of a suspension normally comprising leaf springs E (Figures 5 and 6), the jack A is articulated by means of stirrups 10 on a U channel 2, welded to the chassis B. The end $a$ of the leaf spring E is attached to the end portion of the ram $r$ of the jack, by means of a pivot pin.

Figures 5, 6, 7, 8:
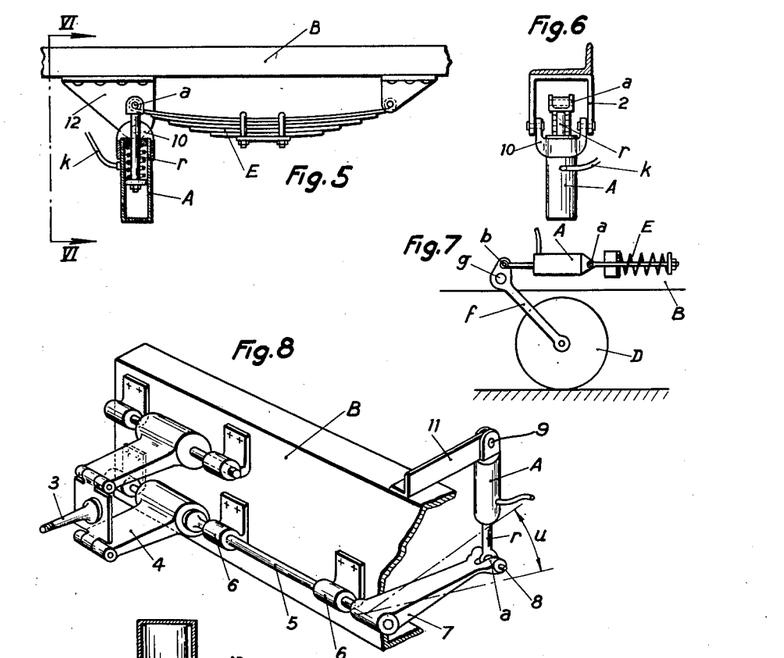
Figures 5 and 6 show the application of the invention to leaf springs, Figure 6 being a section along line VI—VI in Figure 5.
Figure 7 relates to another type of suspension.
Figure 8 is a perspective view relating to the application of the invention to a torsion-bar suspension.

Figure 7 shows the method of mounting in the case of a spring E acting under compression.

Figure 8 relates to a torsion bar suspension. 3 is the stub axle of the wheel, the vertical displacements of which are transmitted by the arm 4 to a torsion bar 5, carried by two bearings 6, fixed to the chassis B. The end of the bar 5, fixed in the usual devices, here carries an arm 7 rigidly secured to it. The terminal portion $a$ of the arm 7 is attached by a pivot 8 to the end of the ram $r$ of the jack A. The other end 9 of A is mounted to pivot on the member 11 fixed to the chassis B.

In these circumstances the arm 7 can pivot through an angle $u$, depending on the modifications in the length of the jack A.

Figure 9:
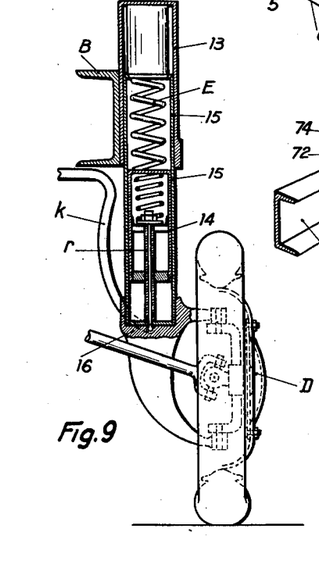
Figure 9 shows, partly in section, the application of the invention to a telescopic suspension.

Figure 9 shows the case of a telescopic suspension comprising the compression spring E, housed in the cylinder 13 fixed to the chassis B. In this embodiment, the jack A comprises a ram $r$ having a fixed hollow rod connected to the feed pipe $k$. The actual body of the jack forms a cylinder 14, the head of which rests against E and which is movable inside a hollow cylindrical lining 15. The bottom of this lining rests at 16 on the wheel axles, while the upper portion of 15 can slide inside the lining 13.

In a preferred embodiment of the invention, the variable length lifting member A may also be combined to advantage not only with the above-mentioned corrective and compensating systems but also with other control devices. These devices act, independently or not:

(a) To stiffen the suspension in the event of acceleration or sudden braking so as to avoid the correlated tilting of the chassis, (b) To give the chassis the appropriate inclination inwards thus permitting the component of the weight and the centrifugal force of the passengers to be perpendicular to the floor of the vehicle, a condition necessary to make the corners imperceptible to the passengers, (c) To keep the floor of the vehicle horizontal on the straight, whatever the camber of the road, (d) To maintain the height of the vehicle above the ground regardless of the load on the said vehicle.

Figure 10:
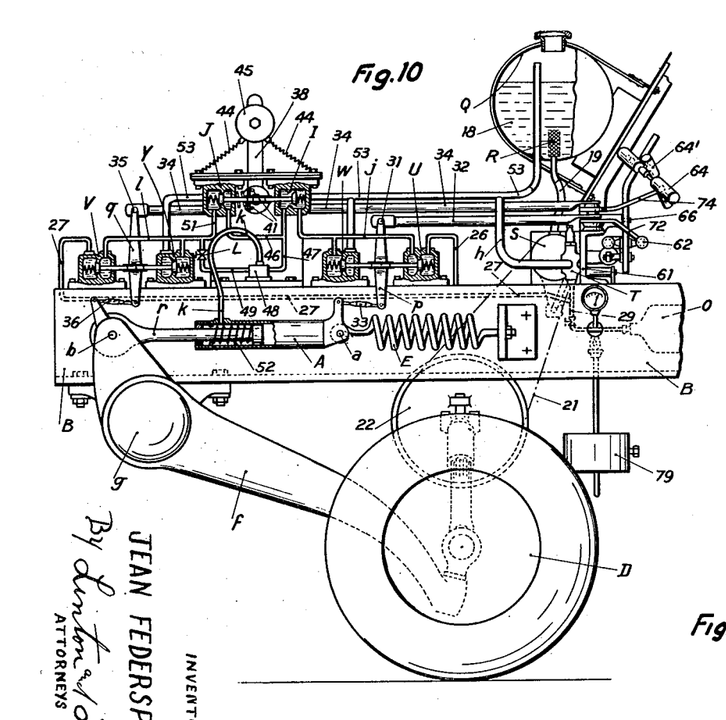
Figures 10A, 11:
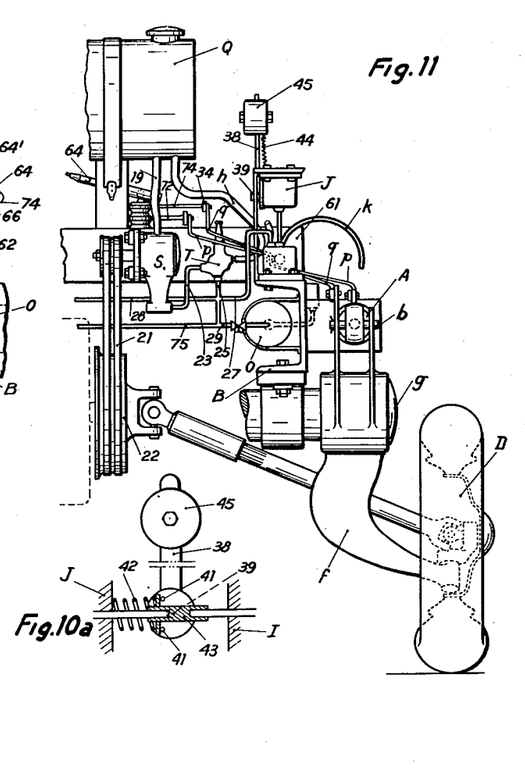
Figure 12:
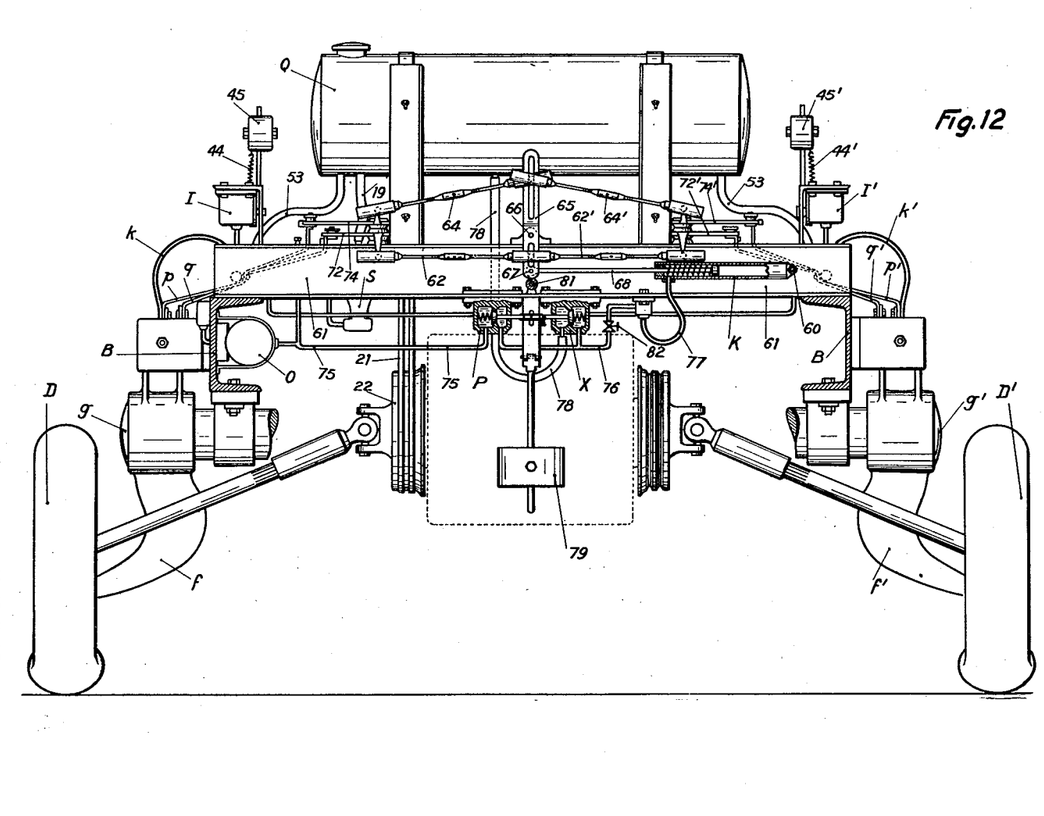
Figure 13:
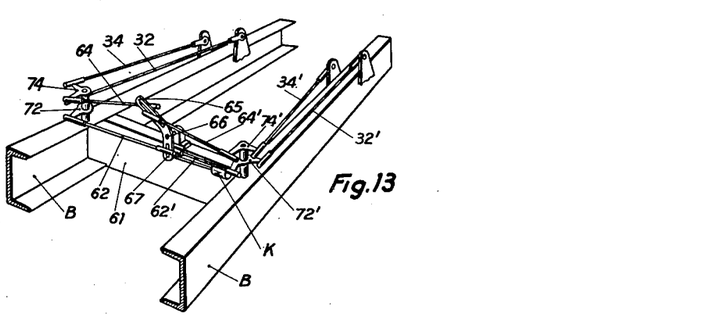
Figure 13 is an explanatory diagram in perspective relating to the previous embodiment.

One non-limiting example of an embodiment including the characteristics of (a) and (b) is described in detail below, with reference to Figures 10 to 12.

Figure 4:
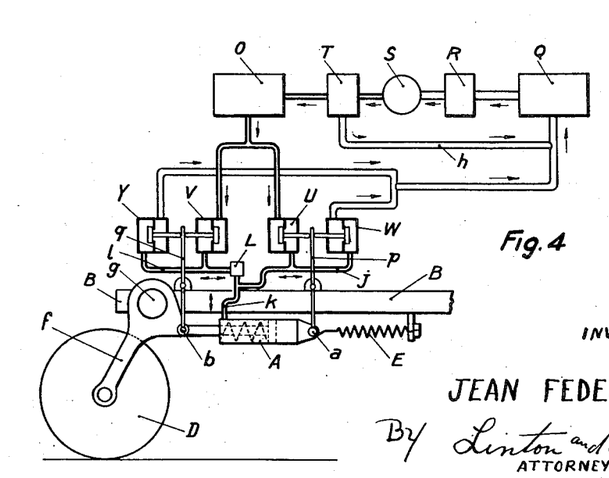
Figure 4 is a more detailed diagram of a device of the type corresponding to that shown in Figure 3.

In these figures are shown the various members of Figure 4. The liquid 18 which actuates the jack A is conveyed from Q to the pump S through R by the pipe 19. This pump is controlled from the driving shaft by a driving device comprising belt 21 and pulley 22. The delivery from S is conveyed by 23 to T. The high pressure liquid is sent from 25 to the distributors U and V via 26 and 27, to the corresponding members belonging to the other wheels via 28, and to O via 29.

The valves of U, W and V, Y are controlled respectively by the levers: $p$ articulated at 31 on a bar 32 and connected to $a$ by a link 33; $q$ articulated at 35 to a bar 34 and connected to $b$ by a link 36.

To the above device there are connected two new distributors I and J, the valves of which are controlled by a lever 38 articulated at 39 and provided with two stops 41. Under the action of the spring 42, the flange of a sleeve 43 rests against these stops (Figure 10a), while the solid inner portion of the sleeve normally keeps the valve of I always open; two return springs 44 normally keep in the central position the lever 38 which carries a weight 45 on its upper portion. This assembly constitutes the stiffening device for the suspension mentioned in paragraph (a) above.

The pipe j emerges in the inlet chamber of I, while the pipe which leaves the outlet chamber divides into 46 leading to the outlet chamber of J, and 47 leading to the junction 48 to which there also leads the pipe 49 connected to l by means of the retarder L constituted by a variable delivery cock. The pipe l is also extended by 51 which leads to the inlet chamber of J. The system formed by L and 49 is therefore mounted in parallel with 51, J, 46 and 47.

To complete this assembly, an expansion pipe 53 returns the low pressure liquid to Q when the valves W or Y are open, and the thrust of the wheels transmitted by f and the ram r causes the extension of the jack, by driving out the oil. The compression spring 52 is intended to limit the effect of this thrust which is the greater, the greater the load on the vehicle.

The above system is preferably repeated for each chain of lifting members associated with a wheel or group of wheels. As for example wheel D' pivoted at g' has similarly connected members (Fig. 12) such as chamber I', weight 45', return spring 44', feed pipe k', levers p', q' which function in a like manner to the corresponding member connected to wheel G as aforementioned. To this system, there is added an assemby intended to incline the vehicle towards the inside of curves (the characteristic mentioned above under (b)). This assembly, of which there is only one for the whole chassis of the vehicle, is fixed to a small girder 61 perpendicular to the longitudinal side-members B of the chassis. It comprises essentially (Figure 12) a jack K articulated at 60, two valve distributors P and X, a deformable quadrilateral composed of four links 62, 64, 62', 64', connected in pairs to an elbowed lever 65, movable about 66, and the lower portion 67 of which is connected to the ram 68 of the jack K. The links 62, 64, 62' and 64' terminate respectively in pivot arms 72, 74, 72' and 74' to which are connected the bars 32, 34 in Figure 10 and 32', 34' on the opposite side.

The inlet chamber of P is fed by O through the pipe 75. The outlet chamber of P and the inlet chamber of X are connected in parallel by the pipe 76 and its extension 77 which leads to K. The outlet chamber of X is connected to Q by 78. The valves of P and X are controlled by a pendulum 79 oscillating about 81. The plane of oscillation of this pendulum is parallel to the small girder 61.

Figure 14:
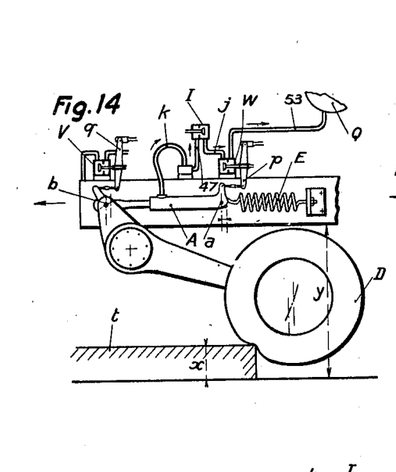
Figures 14 to 19 are sketches illustrating the method of operation.
Figure 15:
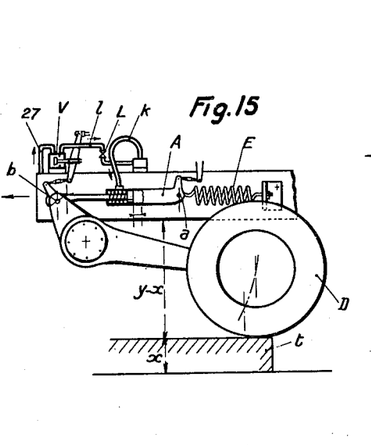

The operation of the various members described above is explained below in the following three hypotheses:

(1) *Passing over a projecting obstacle (Figures 14 to 18) (for example a pavement t situated at a height x above the ground)*.—When the wheel D reaches t (Figure 14) it rises and the spring E begins to extend. The point a is displaced as a result and this causes the opening of the valve of W. The jack A therefore immediately ejects liquid towards Q along the path k, 47, I, j, W, 53. Under the action of the quickacting corrective device, the jack A is therefore extended almost immediately, thus correspondingly limiting the displacement of the spring E and the consequent variations in tension.

When the wheel D has reached the top of t (Figure 15), the jack is considerably extended whereas the point a has returned to its initial position, closing W. The action of the corrective device has prevented the resilient reaction of E on the chassis B which has remained at the same height y in relation to the ground (height y−x in relation to the pavement). Thus the passengers have not felt the rise onto the pavement at all.

Figure 16:
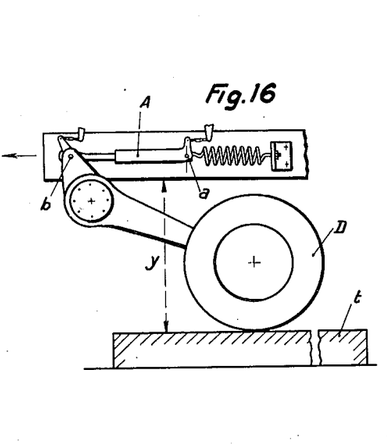
Figure 17:
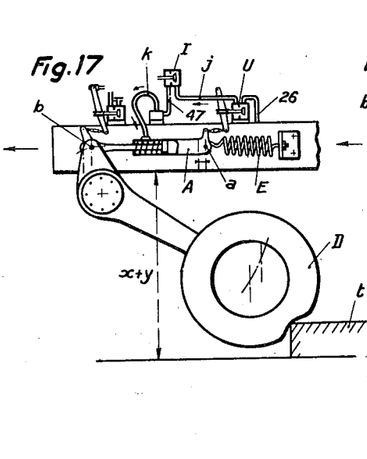
Figure 18:
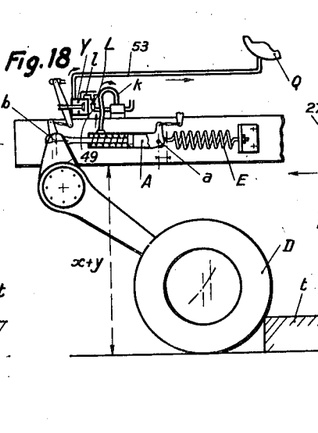
Figure 19:
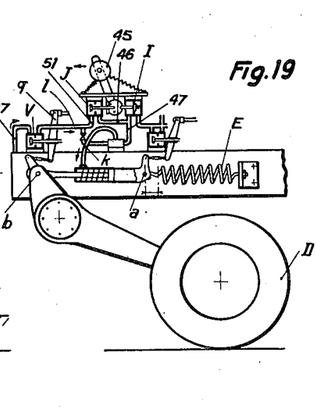

At the same time the displacement of the point b has moved q which opens V and fills A by the path: 27, V, l, L, k. The cock L prevents this filling from being rapid and being transformed into an oscillation having a period of less than 10 seconds. The jack A therefore closes very slowly which imperceptibly restores the chassis to the height y above the pavement (Figure 16).

Going down (Figure 17) the reverse actions take place. E begins by contracting, which opens U. The arrival of liquid under pressure via 26, j, I, 47 and k contracts A. The wheel D then jumps down while the chassis remains at the same height (x+y) in relation to the ground.

At the end of the movement (Figure 18), a has returned to its initial position, but as a result of the displacement of the point b, the action of the compensating device makes itself felt. The jack empties very slowly through k, 49, L, l, Y and 53. The chassis then tends very gently to resume its initial height in relation to the ground.

It is obvious that identical phenomena would take place in the reverse order in the event of crossing a gully.

(2) *Sudden braking-stiffening of the suspension.*—Under the action of braking, the weight 45 moves forwards, closing I and opening J. At the same time the chassis has begun to move towards the ground, thus displacing b towards the left and opening V. Liquid under pressure is then admitted rapidly via 27, V, l, 51, J, 46, 47 and k. The jack therefore closes rapidly which tightens the spring E. Thus the suspension becomes harder and the vehicle does not pitch forward.

Figure 20:
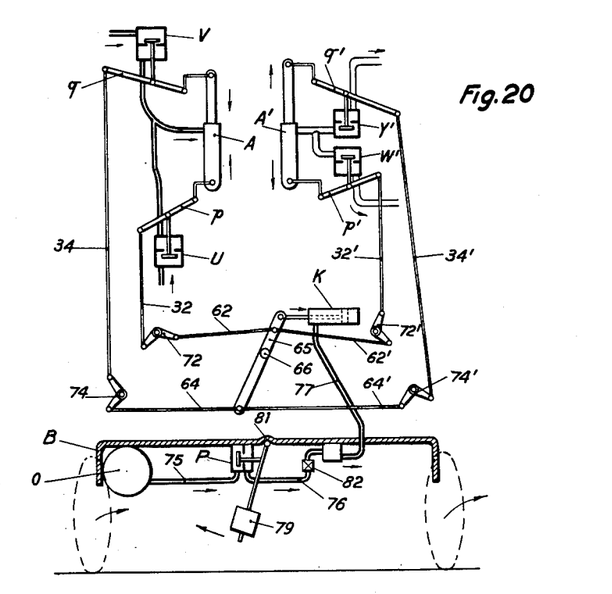
Figures 20 to 22 are sketches illustrating the operation of the stabilizing device when the vehicle goes around corners.
Figure 21:
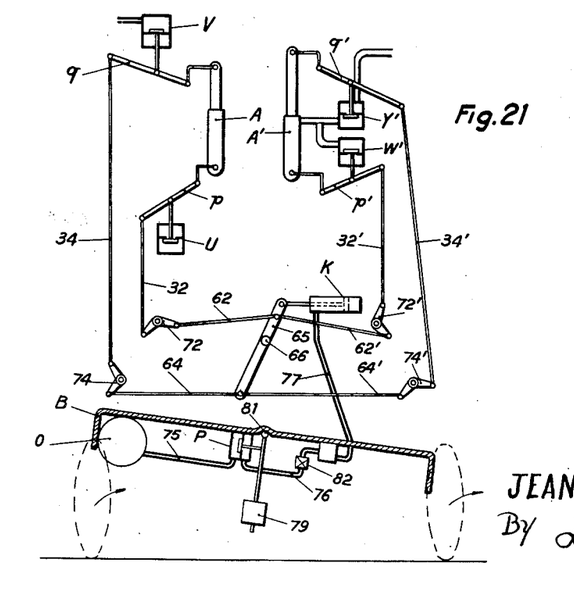
Figure 22:
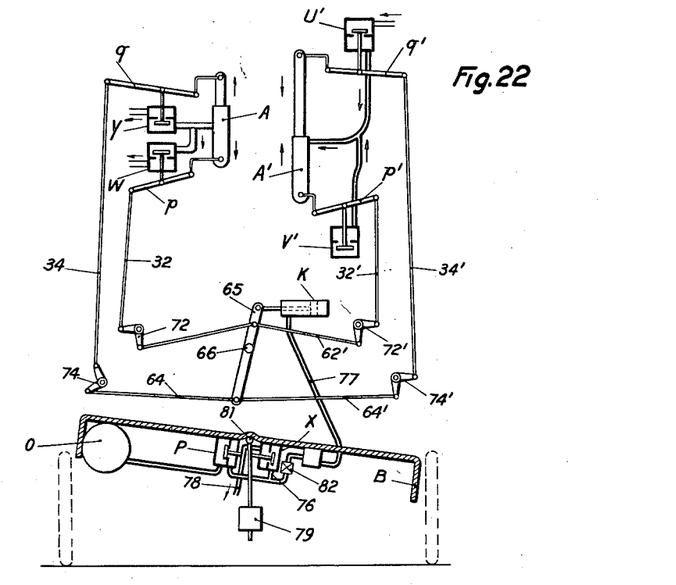

(3) *Vehicle turning right (Figures 20 to 22 where the vehicle is assumed to be seen from the rear)*.—At the beginning of the turn (Figure 20) the chassis B is horizontal. Under the influence of centrifugal force, the pendulum 79 is moved towards the left and opens the valve P. The liquid under pressure brought from O to K by 75, P, 76 and 77 causes the reduction in length of the jack K and the consequent rotation of 65 about 66. This results, by the action of the links 62, 64, 62', 64' and of the bevel gears 72, 74 and 72', 74', in the displacement in opposite directions of the bars 62 and 62' on the one hand and 64 and 64' on the other. Consequently, on the left-hand side of the vehicle, the levers p and q open the valves U and V and on the other side p' and q' open W' and Y'. As a result the jack A is reduced in length and A' is extended. The spring E therefore becomes taut, raising the chassis in relation to the wheel. On the other hand, on the right-hand side, E' contracts causing the lowering of the chassis. Finally B comes to occupy the position shown in Figure 21 for which the pendulum 79 is perpendicular to the floor, which closes P and cuts the feed to K. At the same time, the appropriate modifications having taken place in the length of the jacks, the valves U, V and Y', W' are closed. The vehicle remains inclined throughout the whole turn. As a result the passengers are pulled perpendicular to the seats, and the turn is dynamically correct.

At the end of the turn (Figure 22), the pendulum 79 falls back and opens the valve X. The jack K then empties into Q along the path 77, 76, X, 78. This new movement of the parallelogram 62, 64, 62', 64' this time causes the opening of U', V', which shortens A', and the opening of Y and W causing the extension of A. The chassis B thus rapidly regains its horizontal position.

The action of the device which has just been described can be made more or less noticeable by modifying the delivery along 76 by means of the cock 82.

It will be understood that the corrective action of the pendulum will be felt equally when running in a straight line along a cambered road. By a process analogous to that described above, the return of the chassis to a horizontal position is quickly re-established (characteristic c).

A simple method of making the height of the chassis above the ground independent of the load, in accordance with characteristic d mentioned above, consists in replacing the connecting links such as 33 between a and p (Figure 10) by a dash-pot (Figure 25) consisting of a cylinder 84 provided with a variable-delivery external circulation 85. The piston 86 is attached to A, as is the link 33, while the end of *p* is articulated to the other end of the cylinder 84.

Figure 25:
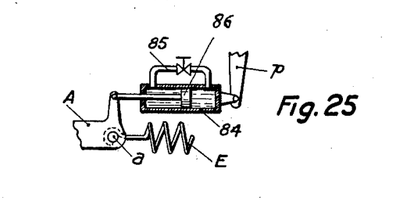
Figure 25 relates to a modification of a detail.

This device transmits the high and medium frequencies intact. On the other hand, an increase in load, which is manifested by the mere displacement of the point *a* towards the left is not reflected on the lever *p*. The distributors U and W therefore remain closed. On the other hand the displacement of the point *b* correlative to the extension of the spring E, causes the opening of V until *b* has returned to its initial position, that is to say the chassis B has regained its normal height in relation to the ground.

The device forming the subject of the invention solves in a simple and precise manner the problem of the perfect suspension of vehicles. The power it requires is very slight in proportion to the power generally available. There is a considerable proportional increase in the comfort on board vehicles. In particular, bumps are suppressed and obstacles, such as open gutters across the road, and level crossings, can be crossed with impunity at any speed. Moreover conventional shock-absorbers become unnecessary with this device.

It goes without saying that numerous modifications could be made to the devices described without going outside the scope of the invention. In the first place the turning device and that for braking could be omitted.

On the other hand a single pendulum could replace both 79 and the weights 45. All that would be necessary for this would be for the pendulum to be mounted in an articulated joint permitting displacement in two perpendicular planes. The control by levers and valves may also be replaced by any equivalent means such as cocks. Finally the transmission by means of links, bevel gears and bars may be replaced by a hydraulic transmission or a cable transmission.

Figure 23:
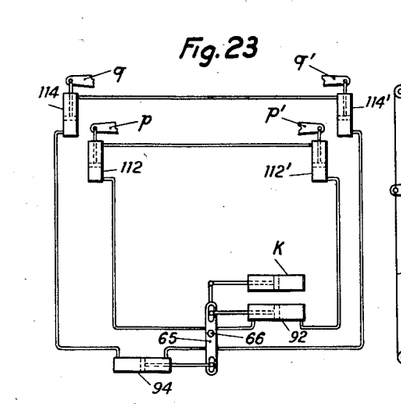
Figures 23 and 24 are sketches relating to modifications of this device.

An example of the first instance is given in Figure 23 where the jack K and the lever 65 can be seen.

Each link is then replaced by a double-acting piston in a cylinder, the two ends of which communicate with the adjacent cylinders. Thus it will be seen that the cylinder 92 and the pipes connected thereto replace the links 62 and 62', 94 replacing 64 and 64', 112 and 114 instead of 32 and 34, etc.

Figure 24:
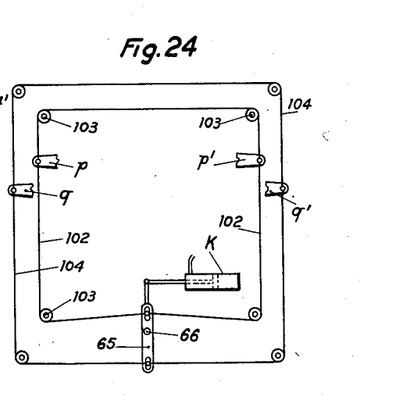

An example of the second type of variant which is even more simple is given in Figure 24. In this system the links 62, 62', the bars 32, 32' and the bevel gears 72, 72' are replaced by a single continuous cable 102, movable on pulleys 103 and to which are attached *p* and *p'*. In the same way the other transmission line is replaced by a cable 104.

I claim:

1. A servo-mechanism for regulating the suspension of vehicles having supports comprising resilient members and wheels for supporting the body thereof, said servo-mechanism comprising in at least one of said supports a lifting member of variable length, quick-acting means to lengthen and shorten said lifting member, slow-acting means to lengthen and shorten said lifting member, means sensing the variations in the distance between one point of said resilient members and the body of the vehicle, said sensing means controlling the quick-acting means accordingly, means sensing the variations in the distance between the wheel and the body of the vehicle, and said second sensing means controlling said slow acting means accordingly.

2. A servo-mechanism according to claim 1 in which the lifting member of variable length is a fluid controlled jack.

3. A servo-mechanism for regulating the suspension of vehicles having supports comprising resilient members and wheels for supporting the body thereof, said servo-mechanism comprising a fluid controlled jack of variable length in at least one of said supports, a high pressure fluid supply, an admission distributor disposed between said fluid supply and said jack, an expulsion distributor connected to said jack, means sensing the variations in the distance between one point of said resilient members and the body of the vehicle, said means selectively controlling said distributors accordingly, a second admission distributor connected to said fluid supply, a second expulsion distributor and a fluid current regulator disposed between said distributors and said jack, means sensing the variations in the distance between the wheel and the body of the vehicle, said second sensing means selectively controlling said second distributors accordingly.

4. A servo-mechanism according to claim 1 in which the lifting member is disposed between said resilient members and members of the wheel of the vehicle.

5. A servo-mechanism for regulating the suspension of vehicles having supports comprising resilient members and wheels for supporting the body thereof, said servo-mechanism comprising a fluid controlled jack of variable length, in at least one of said supports, a high pressure fluid supply, an admission distributor of the valve type disposed between said fluid supply and said jack, an expulsion distributor of the valve type connected to said jack, a lever pivoted on the body of the vehicle, said lever being jointed to one point of said resilient members and selectively actuating the valves of said distributors, a second admission distributor connected to said fluid supply, a second expulsion distributor and a fluid current regulator disposed between said distributors and said jack, means sensing the variations in the distance between the wheel and the body of the vehicle, said sensing means selectively controlling said second distributors accordingly.

6. A servo-mechanism for regulating the suspension of vehicles having supports comprising resilient members and wheels for supporting the body thereof, said servo-mechanism comprising a fluid controlled jack of variable length in at least one of said supports, a high pressure fluid supply, an admission distributor disposed between said fluid supply and said jack, an expulsion distributor connected to said jack, means sensing the variations in the distance between one point of said resilient members and the body of the vehicle, said means selectively controlling said distributors accordingly, a second admission distributor of the valve type connected to said fluid supply, a second expulsion distributor of the valve type and a fluid current regulator disposed between said second distributors and said jack, a lever pivoted on the body of the vehicle, said lever being connected to the axle of one of said wheels and selectively actuating the valves of said second distributors.

7. A servo-mechanism according to claim 1 combined with a device for holding the body of the vehicle parallel to the ground, independently from accelerating and braking, said device comprising a control member having inertia and displaceable in a longitudinal plane of the vehicle, return means for returning said control member into a medium position and means connected to said control member to lengthen and shorten said lifting member accordingly.

8. A servo-mechanism according to claim 3 combined with a device for holding the body of the vehicle parallel to the ground independently from accelerating and braking, said device comprising a valve admission distributor connected to said high pressure fluid supply and to said jack, a valve expulsion distributor connected to said jack, a pendulum displaceable in a longitudinal plane of the vehicle and said pendulum selectively controlling the valves of said last distributors.

9. A servo-mechanism according to claim 1 combined with a cornering regulator intended to incline the vehicle towards the center of the turn, said regulator comprising a control member having inertia and displaceable in a transverse plane of the vehicle, return means for returning said control member into a medium position, and means connected to said control member to lengthen and shorten said lifting member accordingly.

10. A servo-mechanism according to claim 1 in a vehicle having on both sides lifting member, said servo-mechanism being combined with a cornering regulator intended to incline the vehicle towards the center of the turn, said regulator comprising a high pressure fluid supply, a fluid controlled auxiliary jack of variable length, a valve admission distributor connected to said fluid supply and to said jack, a valve expulsion distributor connected to said jack, a pendulum displaceable in a transverse plane of the vehicle, said pendulum selectively controlling the valves of said distributors, and transmission means connected to said auxiliary jack for selectively controlling said quick acting means and slow acting means on both sides of the vehicle.

11. A vehicle according to claim 5 in which a dash-pot is interposed between the lever pivoted on the body of the vehicle and its junction point with the resilient members.

12. A servo-mechanism according to claim 1 for regulating the suspension of vehicles having supports comprising torsion bars and wheels for supporting the body thereof, said lifting member being inserted between the body of the vehicle and the end of said torsion bar.

References Cited in the file of this patent

UNITED STATES PATENTS

| | | |
|---|---|---|
| 2,490,311 | Rostu | Dec. 6, 1949 |
| 2,644,699 | Weiertz | July 7, 1953 |